June 19, 1962 J. WATT 3,040,293
SUBAQUEOUS ECHO SOUNDERS
Filed Oct. 20, 1958

INVENTOR:
James Watt
BY: Baldwin & Wight
HIS ATTORNEYS

United States Patent Office 3,040,293
Patented June 19, 1962

3,040,293
SUBAQUEOUS ECHO SOUNDERS
James Watt, Chelmsford, England, assignor to The Marconi Sounding Device Company Limited, London, England, a British company
Filed Oct. 20, 1958, Ser. No. 768,147
Claims priority, application Great Britain Dec. 5, 1957
5 Claims. (Cl. 340—3)

This invention, which is for improvements in or modifications of the invention contained in our co-pending specification Serial No. 598,130 relates to subaqueous echo sounders and more specifically to such echo sounders of the kind adapted to examine with high resolution a predetermined relatively small part of the depth of water under the ship carrying the echo-sounding equipment—usually, though not necessarily, a small part consisting of a few fathoms above the bottom.

Echo sounders of this kind are of great advantage to fishing trawlers using the equipment to find shoals of fish. In general the master of a trawler using his echo sounder to find shoals of fish is most interested in the depth interval between the bottom and some four or five fathoms above it, for it is in this interval that his trawl will operate. Although a normal echo sounder with a depth range of, say, several hundred fathoms, will indicate or record strong echoes from this very limited depth interval, much better resolution and sensitivity can obviously be obtained from an echo sounder whose range can be adjusted so as more or less to coincide with the limited depth interval to be examined, and for this reason it has become common to equip trawler and similar echo sounders with means whereby a desired depth interval of a few fathoms can be examined in detail. In general the indicator used for such detailed examination is a cathode ray tube, the ray in which is deflected in one of two co-ordinate directions by a time base generator adapted to move the spot across the screen at a speed corresponding to the depth interval required, for example, if full deflection is to correspond to a depth interval of about 5 fathoms, the time taken for full deflection is chosen to be about twelve and a half milli-seconds. The position of the depth interval in the total depth under the ship is, in present practice, selected by selection of a required delay between transmission of a sounding pulse and commencement of the time base sweep of the cathode ray tube. Thus, if it were desired to examine in detail the lowest 5 fathom depth interval in a depth of 300 fathoms, the commencement of the time base sweep of 12½ milliseconds would be delayed about 750 milliseconds after transmitting the sounding pulse. Echoes returning from the selected depth are fed to produce deflection of the cathode ray in the other co-ordinate direction and thus the tube displays echoes in the desired depth interval to the full deflection scale of the tube.

This known method of displaying a selected depth interval by initiating a high speed time base deflection corresponding to that interval after a time delay chosen in dependence upon the depth at which said interval is to be, has serious disadvantages. It will be seen that, in effect, what the method accomplishes is the selection of the depth interval at a desired depth below the ship. If, however, the ship is in heavy seas its vertical movement may be considerable—where the selected depth interval is small such movement may be by no means negligible compared to the said depth interval. Moreover, the sea bed itself may be of an undulating nature. In addition, if the chosen time delay is not accurately maintained (and it is not easy to secure accurate maintenance in practice) the depth of the selected depth interval for display will vary; thus a variation of only 1% in a 750 millisecond delay is equivalent to a depth change of about 3 fathoms. The result is that a fixed target at a given height above the bottom, or the bottom itself, for that matter, appears in the display to be moving up and down.

This makes the display difficult and fatiguing to read and interpret and is a most unsatisfactory feature of known echo sounders of the kind referred to.

The parent invention seeks to avoid the above defects and according to the said parent invention an echo sounder of the kind referred to comprises means for transmitting pressure waves into a medium, means for receiving reflected pressure waves, means for indicating received pressure waves against a time base sweep appropriate to a desired depth interval to be explored and means actuated at a desired predetermined time relation with the reception of pressure waves reflected from the bottom of said medium, for initiating said time base sweep.

The parent specification describes three ways of carrying this invention into effect. In one of these ways periodic main pulses on one frequency are transmitted into the sea and each main pulse is preceded by an exploring pulse which is on another frequency and is a predetermined time in advance of the immediately following main pulse, the received reflected exploring and main pulses being separated at the receiver by frequency selective means and the received reflected exploring pulse being employed to initiate a time base sweep against which echoes due to the main pulse are displayed. In another way, which is, in effect, a modification of the foregoing way, each exploring and succeeding main pulses are not sent as separate pulses but are constituted by the leading and trailing edges respectively of a long continuous wave pulse (for example 10 milliseconds long), the total echo signal being received at the receiver, rectified, and passed through a differentiating circuit to produce signals of opposite polarity due to the leading and trailing edges respectively, the signals corresponding to the leading edges being separated and used to initiate a time base sweep against which signals corresponding to the trailing edges are displayed. In a third way periodic pulses are transmitted into the sea and reflected received echoes are fed through a time delay device to a display device where they are indicated against a time base sweep which is initiated after a smaller time delay (which may be zero) after reception of echoes from the sea bottom, sea bottom echoes for initiation of the time base sweep being separated from other echoes by virtue of their greater strength.

Each of these ways of carrying out the parent invention has certain disadvantages, though all are effective and practical. The use of exploring and main pulses on different frequencies has, of course, the defect of added cost and complexity due to the necessity of providing two different frequency sources and other apparatus selectively responsive to each of the frequencies. The same defect of added cost and complexity is also present in the method involving exploring and main pulses by the leading and trailing edges of a long continuous pulse. The method in which the received reflected echoes are delayed before display has the defect that, since the echo signals are a more or less complex train of signals which must not be seriously distorted or changed by being delayed, the delay means must be designed to be practically distortion free and will therefore be expensive.

The present invention seeks to provide a further method of carrying out the parent invention which shall avoid the defects of the methods described in the parent specification, and be very simple and at the same time effective and satisfactory if not, perhaps, theoretically quite so good as the method set out in the parent specification.

According to this invention an echo sounder of the kind referred to comprises means for transmitting pressure waves into a medium, means for receiving reflected pressure waves, means for indicating received pressure waves against a time base sweep appropriate to a desired depth interval to be explored, means for delaying for a predetermined time signals corresponding to received pressure waves reflected from the bottom of said medium, and means for utilising the delayed signals to initiate said time base sweep. Thus, in carrying out the present invention, periodic pulses are transmitted into the sea, the received bottom signals are delayed and the delayed bottom echoes used to initiate the time base sweep appropriate to the desired depth interval to be explored. In this way the exploration of the desired depth interval is, as in the parent invention, an interval whose upper boundary is a predetermined and selectable height above bottom as distinct from a predetermined and selectable depth below the ship. The present invention has the theoretical defect that each exploration of the depth interval is tied to the bottom echo from the preceding transmitted pulse instead of to the transmitted pulse which actually explores the depth interval, but, in practice, the pulse repetition rate is high enough for this to be a theoretical rather than a practical defect. Again the time delay required for delaying the bottom echo signal will be very much longer than in the case described in the parent specification in which delay is used. As against these defects, however, there is the great advantage that the delayed signal is not required to be displayed but merely to be used as an initiating signal or mere trigger. The delay means therefore do not have to be distortionless and may therefore be cheap and simple: e.g. they may be constituted by a simple pulse responsive trigger circuit adapted to produce a pulse a predetermined time after a pulse is fed thereto, with no necessity for close correspondence or even similarity of wave form as between the pulse fed in and the pulse fed out. Again the delay, being a long one, can be satisfactorily produced by recording the bottom echo signal on a moving magnetic drum, tape or wire and picking up the delayed signal from another point along it.

The invention is illustrated in the accompanying drawings, which are simplified representations of two embodiments.

For the sake of simplicity in description separate transmitting and receiving transducers are shown in both embodiments, but it will be understood that a common transducer may be used both for transmission and reception as in the well known way.

Figure 1:
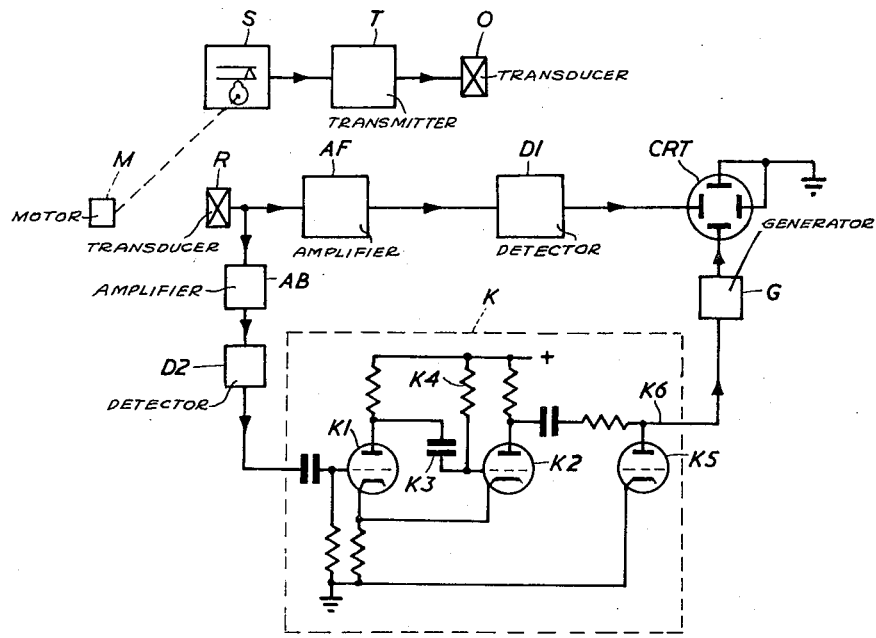
FIGURE 1 shows a schematic diagram of one embodiment of the invention.

Referring to FIGURE 1, T is a supersonic frequency pulse transmitter operating at a desired pulse repetition frequency, for example once per second, and actuated by a triggering pulse produced by a trigger switch or other device conventionally represented at S driven by a timing electric motor M as conventionally represented by the chain line. Once per second (for example) the motor M actuates the trigger device S to make the transmitter T supply a pulse of supersonic waves to the transducer O which transmits a pulse of supersonic pressure waves through the water.

Reflected pressure waves are received upon a receiving transducer R and amplified by an amplifier AF whose output is detected by a detector D1 feeding one of the co-ordinate deflecting means of a display cathode ray tube conventionally represented at CRT.

Output from the receiving transducer R is also fed to a second amplifier AB of considerably less gain than the amplifier AF (either or both these two amplifiers may conveniently be of an adjustable gain) and which feeds into a detector D2. This detector may conveniently be biassed back so that it will not respond to input signals below a predetermined minimum threshold value. In this way it is ensured that the output from the detector D2 will correspond only to bottom echoes, since such echoes will normally be considerably more powerful than echoes from, for example, fish or other reflectors situated in the depth interval to be explored. The output from the detector D2 is fed through a delay device within the block K and the delayed signal output therefrom is used to trigger any convenient known form of time base wave form generator G which produces a saw tooth time base wave for application to the other co-ordinate deflection means for the display tube CRT. By the term "delay device" as used in this specification is meant any device which will produce an output signal after a predetermined delay in response to an input signal fed thereto. It is not necessarily a device in which the output signal is a delayed repetition of the input signal, but may be one in which the output signal is internally generated within the delay device and is, perhaps, of quite different wave shape. To quote practical but not limiting figures, if the transmitted pulse repetition frequency is one pulse per second, the delay introduced by the device K might be, for example, 992 milliseconds, i.e., the pulse repetition period less twice the propagation time of pressure waves in one direction between the top of the depth layer to be examined and the sea bottom. With these figures each transmitted pulse would produce a bottom echo which would be delayed and used to initiate a time base excursion at such time as to cause the tube to display any targets encountered by the next transmitted pulse in a depth about 3 fathoms above the bottom.

The time delay device K may take any of a variety of simple forms. In FIGURE 1 it is in the form of a pulse responsive trigger circuit as known per se. This consists of two valves K1 and K2 of which the valve K2 is normally conductive and K1 normally cut off. The connections of these valves in the circuit are, as will be seen, such that, if K1 is rendered conductive it cuts off K2. Pulses from the detector D2, assumed to be positive going, are fed to the control grid of the valve K1 and are of sufficient magnitude to render it conductive. As will be apparent to those skilled in the art, each positive pulse applied to the control grid of valve K1 will produce a negative pulse at the anode of valve K2 after a time delay determined by the constants of the circuit (and notably by the value of the coupling condenser K3, the resistance K4 and the applied potentials). It will also be seen that, prior to each such negative pulse, a positive pulse is produced at the anode of valve K2, but this is rendered ineffective by a diode K5 connected between the output lead K6 and earth. The generator is, of course, arranged in known manner to be triggered by the negative pulses on the lead K6.

Figure 2:
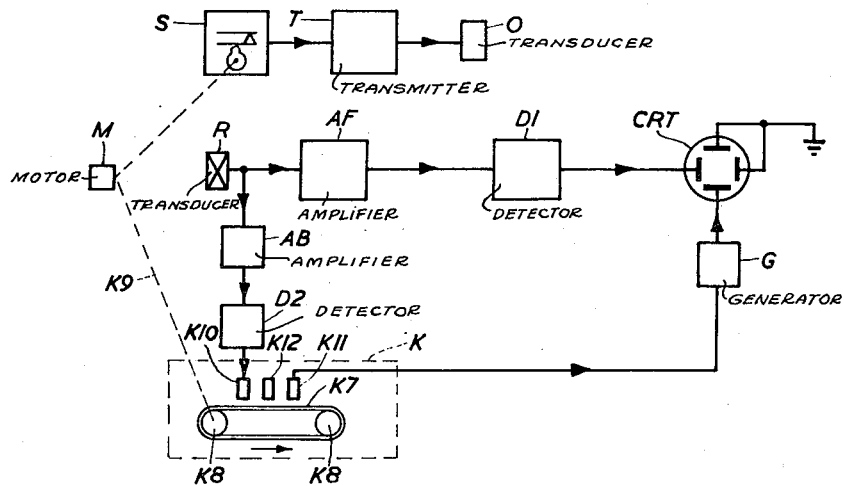
FIGURE 2 shows a block diagram of a modification of the system shown in FIGURE 1.

The modification shown in FIGURE 2 differs from that of FIGURE 1 only in the form of time delay device employed. In FIGURE 2, this consists of a magnetic recorder and pick-up arrangement comprising an endless magnetic wire K7 run over pulleys K8 driven in the direction of the arrow by the motor M as indicated by the chain line K9. Any appropriate gear box (not shown) may be interposed in the drive K9. The output pulses from the detector D2 are recorded on the wire by a recording head K10 and picked up for feeding to the generator G after the required time delay by a reading head K11 suitably spaced from the writing head K10. An erasing head K12 is also provided in known manner to erase each recorded pulse after it has been read off by the head K11. Since the drive K9 to the recording tape is from the same motor M which operates the trigger device S, any lack of constancy in the transmitted pulse repetition rate will not cause trouble, since variations in the time interval between one transmitted pulse and the next will be accompanied by corresponding variations in the drive K9. Obviously in place of the recording wire or tape arrangement shown and including the wire or tape K7 a magnetic recording drum as known per se could be used.

In carrying out the present invention, as in the case of the parent invention, it is of course necessary to provide the apparatus with means for suppressing direct signals from the transmitter or strong early echoes from reflecting objects near thereto in order to prevent incorrect initiation of the time base sweep by such strong direct signals or early echoes. Such suppressing means may be constituted for example by gating circuits arranged to prevent reception for short periods during and after each transmission as known per se in echo sounding practice. Thus, for example, means could be provided for suppressing the bottom echo amplifier AB and/or the fish echo amplifier AF (preferably both) for periods each including and slightly longer than each transmission pulse.

I claim:

1. An echo sounder of the kind adapted to be carried by a ship to examine with high resolution a predetermined relatively small part of the depth of water under the ship comprising means for transmitting pulses of pressure waves of a given frequency, means for receiving reflected pressure wave pulses, an indicator of the kind adapted for deflection of a trace thereon in one direction to provide a time base sweep and in a co-ordinate direction for the display of signals against said time base sweep, means for applying signals corresponding to received pulses for display on said indicator, deflection means for deflecting the trace on said indicator to provide said time base sweep for the period during which signals corresponding to received pulses from said predetermined part of the depth of water are applied to said indicator, means for separating the bottom echo pulses from the fish echo pulses, and means to apply the bottom echo pulses to initiate the said time base sweep, said last mentioned means including delay means to delay the bottom echo pulses before application to the deflecting means by a time interval dependent upon the depth interval to be examined and means for applying received fish echo pulses to the deflection means for effecting coordinate deflection against said time base sweep, said delay means providing a delay of such value that the bottom echo pulse results from a pulse transmitted prior to the pulse from which said fish echoes are displayed.

2. An echo sounder of the kind adapted to be carried by a ship to examine with high resolution a predetermined relatively small part of the depth of water under the ship comprising means for transmitting pulses of pressure waves of a given frequency at a predetermined pulse repetition frequency, means for receiving reflected pressure wave pulses, an indicator of the kind adapted for deflection of a trace thereon in one direction to provide a time base sweep and in a co-ordinate direction for the display of signals against said time base sweep, means for applying signals corresponding to received pulses for display on said indicator, deflection means for deflecting the trace on said indicator to provide said time base sweep for the period during which reflected pulses from said predetermined part of the depth of water are received, means for separating the bottom echo pulses from the fish echo pulses, and means to apply the bottom echo pulses to initiate the said time base sweep, said last mentioned means including delay means to delay the bottom echo pulses before application to the deflecting means by a time interval dependent upon the depth interval to be examined and means for applying received fish echo pulses to the deflection means for effecting coordinate deflection against said time base sweep, said delay means providing a delay equal to the time repetition period of the transmitted pulses less twice the propagation time of pressure waves in one direction between the top of said predetermined part of the depth to said bottom.

3. An echo sounder as claimed in claim 2 wherein the delay means consists of a magnetic recorder and pick-up device comprising a recording head arranged to record signals corresponding to received pressure wave pulses from the bottom on a magnetic recording material which is moved at predetermined speed in relation to said recording head and also in relation to a pick-up head adapted to pick up the recorded signals, the delay being determined by the time interval between the passage of any given point on said material between the two heads.

4. An echo sounder as claimed in claim 2 wherein the signals corresponding to received pressure wave pulses from the bottom are derived by means including a detector which is biassed to be non-responsive to signals of less than a predetermined amplitude.

5. An echo sounder as claimed in claim 2 wherein said delay means comprises a triggered pulse source adapted to be triggered by input pulses fed thereto and, when triggered, to produce an output pulse after a predetermined delay.

References Cited in the file of this patent

UNITED STATES PATENTS

| 2,721,987 | Richard | Oct. 25, 1955 |
| 2,788,509 | Bolzmann | Apr. 9, 1957 |

FOREIGN PATENTS

| 1,140,572 | France | Mar. 4, 1957 |